United States Patent
Crow

(10) Patent No.: US 9,808,118 B2
(45) Date of Patent: Nov. 7, 2017

(54) VERTICAL COOKING APPARATUS

(71) Applicant: Plinio Francisco Crow, Vancouver, WA (US)

(72) Inventor: Plinio Francisco Crow, Vancouver, WA (US)

( * ) Notice: Subject to any disclaimer, the term of this patent is extended or adjusted under 35 U.S.C. 154(b) by 436 days.

(21) Appl. No.: 14/572,315

(22) Filed: Dec. 16, 2014

(65) Prior Publication Data

US 2015/0164276 A1    Jun. 18, 2015

Related U.S. Application Data

(60) Provisional application No. 61/916,591, filed on Dec. 16, 2013.

(51) Int. Cl.
    *A47J 37/06*      (2006.01)
    *A47J 37/04*      (2006.01)

(52) U.S. Cl.
    CPC ......... *A47J 37/0694* (2013.01); *A47J 37/049* (2013.01); *A47J 37/0688* (2013.01)

(58) Field of Classification Search
    CPC .. A47J 37/0688; A47J 37/0694; A47J 37/049; A47J 33/00; A47J 37/00; A47F 5/01; A47F 5/13
    USPC ................. 99/450, 448, 393, 396, 399, 402; 211/181.1
See application file for complete search history.

(56) References Cited

U.S. PATENT DOCUMENTS

| | | | | |
|---|---|---|---|---|
| 861,036 A * | 7/1907 | Kodatz | ............... | A47J 37/0694 99/402 |
| 2,703,046 A * | 3/1955 | Ahlquist | ................ | A47J 43/18 16/262 |
| 2,809,580 A * | 10/1957 | Richard | ............. | A47J 37/0694 29/850 |
| 3,207,059 A * | 9/1965 | Hirons | ............... | A47J 37/0694 16/373 |
| 4,479,422 A * | 10/1984 | Wagstaff | ............ | A47J 37/0694 99/395 |
| 4,559,869 A * | 12/1985 | Hogan | ................ | A47J 37/0694 211/184 |
| 4,952,764 A * | 8/1990 | Harrington | ........... | A47J 36/027 219/732 |
| 5,823,100 A * | 10/1998 | Wienhold | .............. | A21B 3/155 108/91 |
| RE37,955 E * | 1/2003 | Kiczko | ............... | A47J 37/1295 99/416 |
| 7,159,510 B2 * | 1/2007 | LaMaster | .............. | A23B 4/031 99/349 |
| D689,344 S * | 9/2013 | Cloutier | ........................ | D7/686 |

* cited by examiner

*Primary Examiner* — Reginald L Alexander
(74) *Attorney, Agent, or Firm* — Rylander & Associates, PC; Kurt M. Rylander; Philip R. M. Hunt

(57) ABSTRACT

A wire rack apparatus which fits on top of a shallow flat baking sheet pan and oven that supports a plurality of bacon slices vertically during roasting so that grease and fat and particular water within the body of bacon slices runs onto the shallow baking sheet pan. The bacon rack has a series of spaced upright wire mesh racks extending from a main support base rack. The upright wire mesh racks are positioned in elevated relation to a shallow baking sheet pan during cooking. The mesh racks are removably secured by U-shaped bend inserted slots to the main support base rack. Bacon slices are placed in the upright rack during roasting.

5 Claims, 15 Drawing Sheets

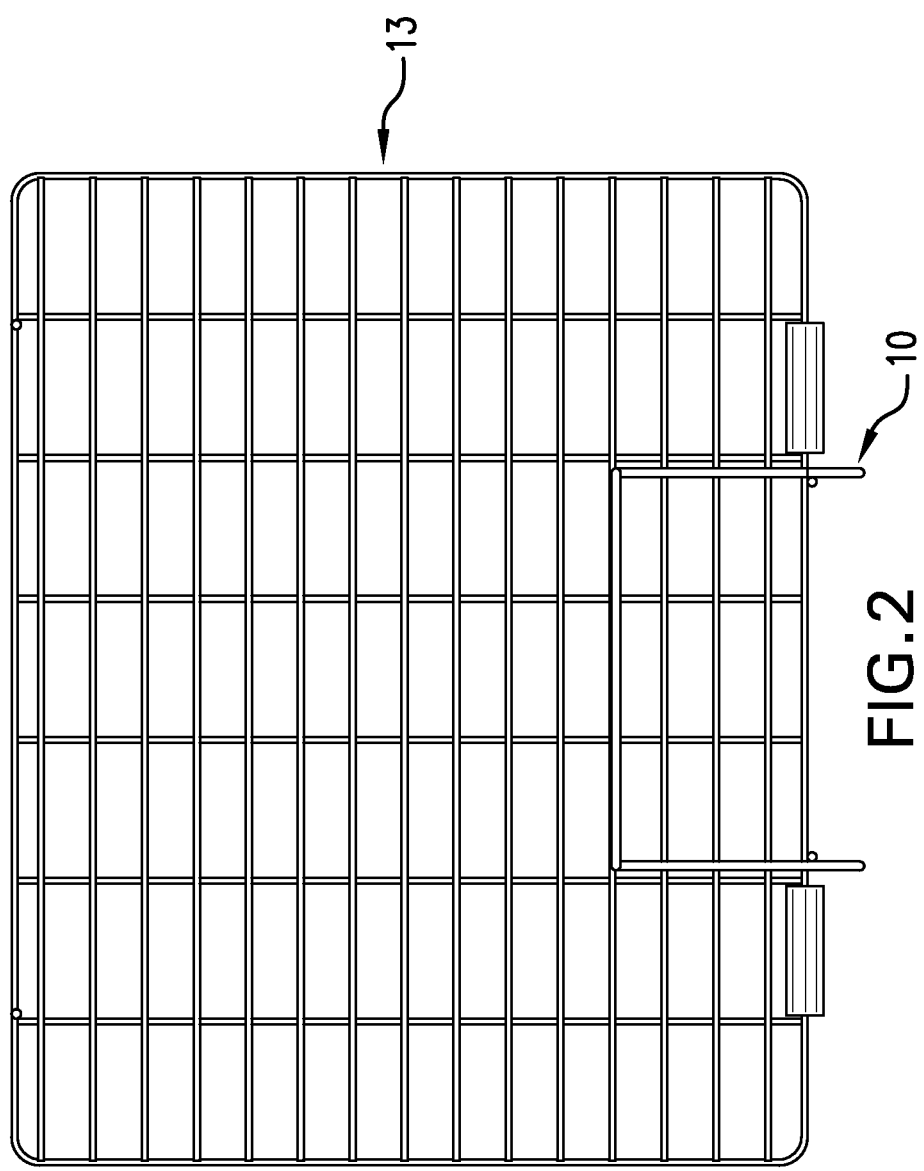

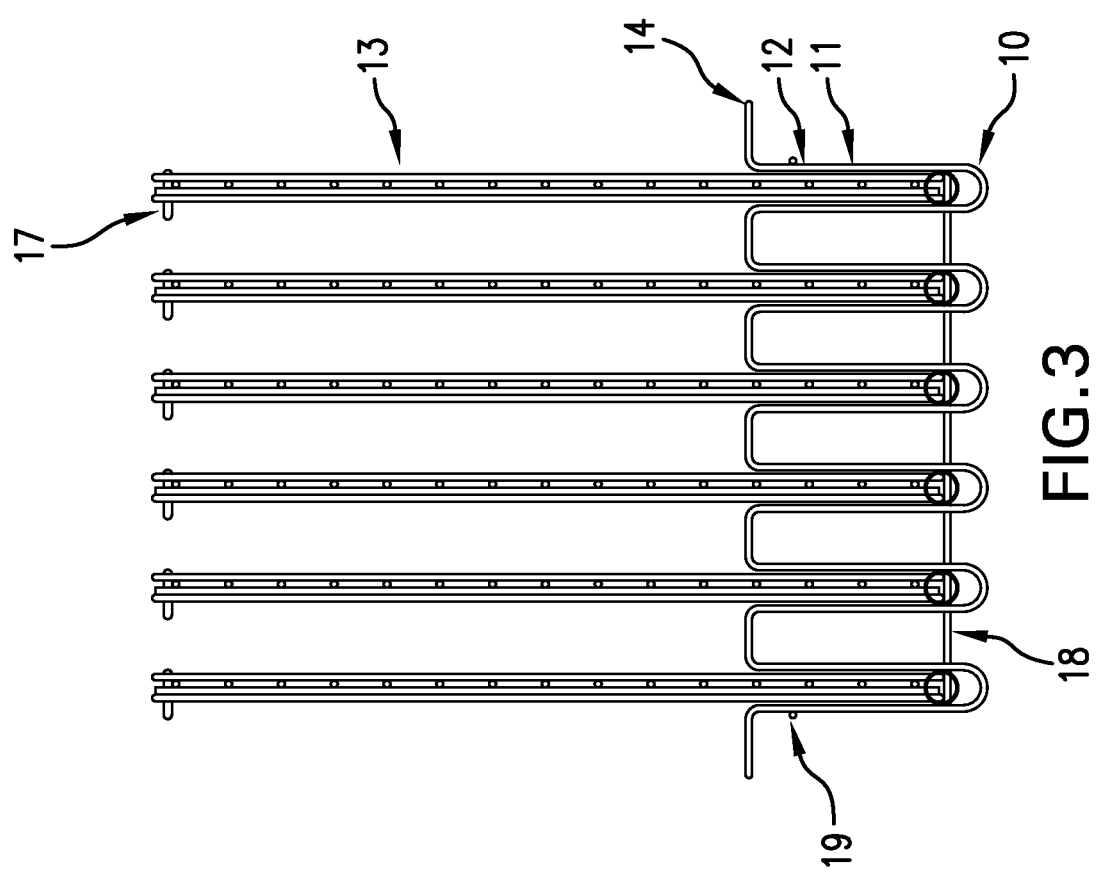

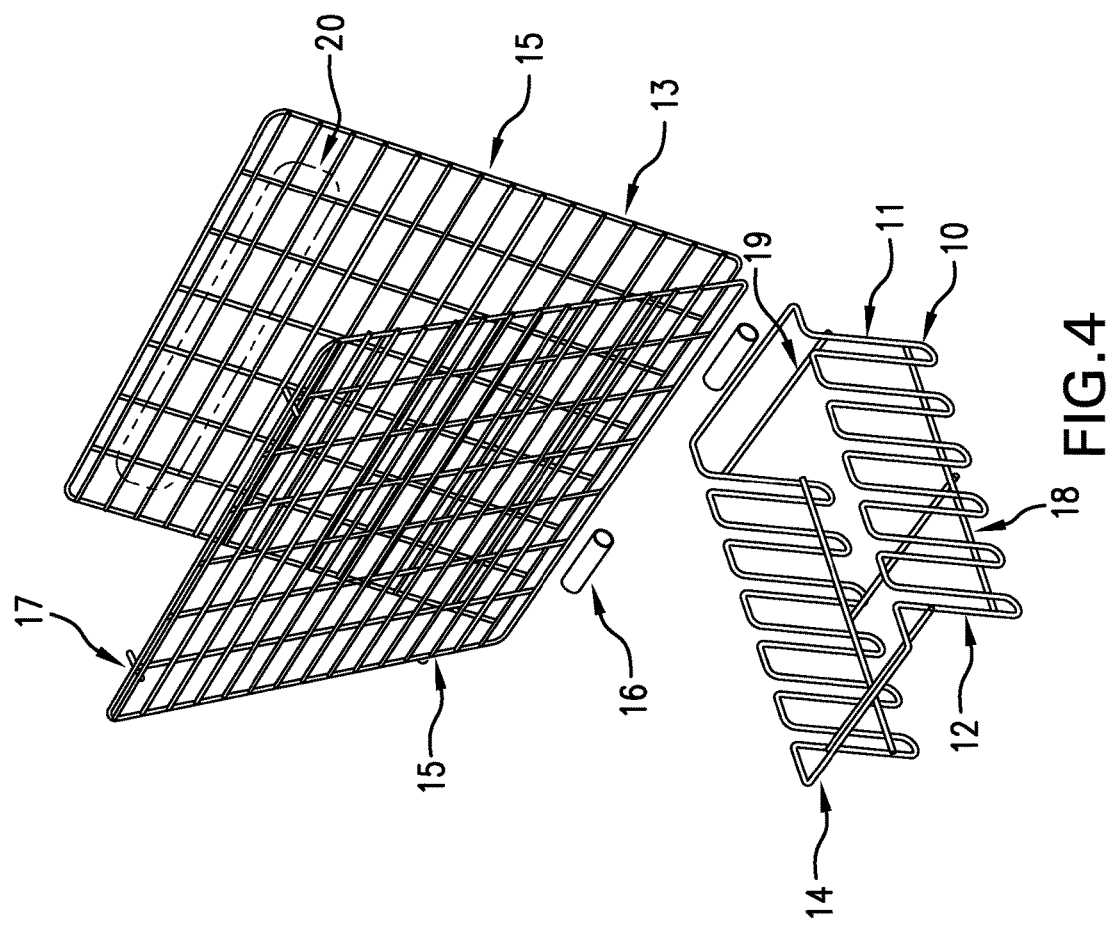

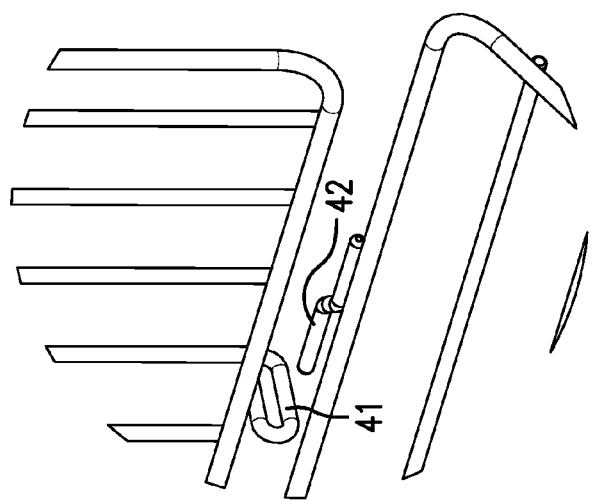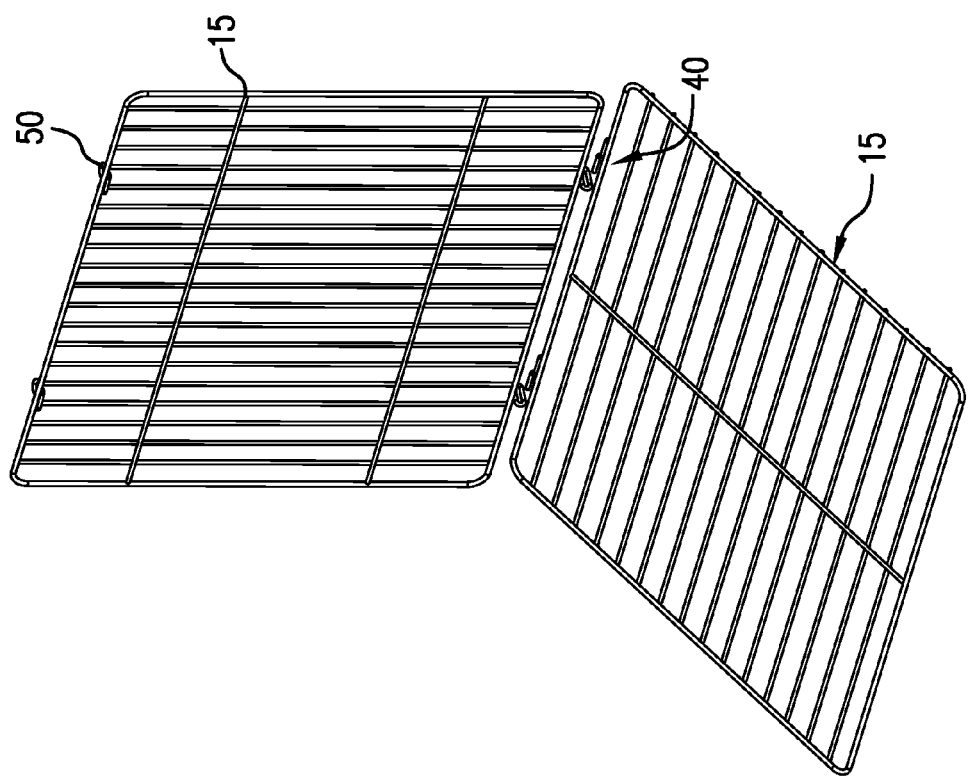

VERTICAL COOKING APPARATUS

CROSS-REFERENCE TO RELATED APPLICATION

This application is a nonprovisional patent application of and claims priority to Provisional Application Ser. No. 61/916,591, filed Dec. 16, 2013, and which is herein incorporated by reference in its entirety.

FIELD OF THE INVENTION

The present invention relates to apparatus for separating and holding strips of meat products as they are being cooked, and more particularity to apparatus separating and holding strips of bacon as the strips are cooked in an oven.

BACKGROUND

Frying strips of bacon has been one of the messiest of all kitchen chores. While cooking the bacon, grease often splatters onto the following items: stovetops, counter tops, kitchen floors, and persons cooking the bacon itself. The person may receive some severe discomfort from grease burns on the skin or eyes from the frying of the bacon. Furthermore, as is now the case, bacon is usually fried in a frying pan, the heat being applied directly to only one side of the bacon at a time. In this manner, much energy is wasted, escaping through the frying pan into the air and unduly heating the kitchen room. Also, when cooking bacon in the oven in a shallow flat baking sheet pan the same conditions also applies as to the heat is directly applied to only one side of the bacon at a time. With each different methods of cooking the bacon, oven or stovetop, the bacon strips are often over cooked on one side than on the other and also comes out greasy because the bacon is held in the grease that normally cooks out of the bacon. Another drawback in cooking bacon in the oven or stovetop methods is that the bacon strips tend to significantly crinkle or shrink which often makes the bacon look very unappealing and tastes over-cooked.

Generally, as strips of bacon are cooked, the bacon has a tendency to shrink in size, to curl and to soak up a considerable amount of the grease in which is produced by the bacon itself during cooking. Additionally, if several pieces of bacon are cooked together, there is a tendency for the pieces to cling together if not kept separate. The use of oven cooking is the prefer method of cooking bacon, but has little to overcome the problems of shrinkage, curing, sticking together and fat grease absorption.

It would be advantageous to have an apparatus to assist in uniformly and efficiently cooking strips of bacon with minimum of mess and inconvenience; to hold strips of bacon so they may be cooked on both sides simultaneously; that allows grease to drain from the bacon while it is cooking, providing substantially less greasy cooked bacon; to reduce the shrinkage and absorption of grease by strips of bacon during the cooking of the bacon in an oven; to support the strips of bacon in an elevated parallel vertically oriented array while the bacon is being cooked; and/or to cook bacon without the need for constant turning over the strip of bacon when cooking in an oven.

SUMMARY AND ADVANTAGES

Applicant's vertical cooking apparatus supports and separates strips of meat such as bacon as the meat is cooked in an oven setting. A wire rack apparatus which fits on top of a shallow flat baking sheet pan and oven that supports a plurality of bacon slices vertically during roasting so that grease and fat and particular water within the body of bacon slices runs onto the shallow baking sheet pan. The bacon rack has a series of spaced upright wire mesh racks extending from a main support base rack. The upright wire mesh racks are positioned in elevated relation to a shallow baking sheet pan during cooking. The upright wire mesh racks are removably secured by U-shaped bend inserted slots to the main support base rack. Bacon slices are placed in the upright rack during roasting. The wire rack apparatus comprises of a rectangular shaped main support base wire rack with raised sides and U-shaped bend inserted slots for holding the upright wire mesh racks. Attached to the end sides of the main support base wire rack are handles for use in picking up and carrying the vertical cooking apparatus. The upright wire mesh racks are removably secured to the main support base rack resting in the U-shaped bend inserted slots. There are a plurality of upright wire mesh racks mounted on top of the main support base rack for holding the strips of bacon during cooking. The upright wire mesh racks are arranged at spaced intervals apart from each other held by their respected U-shaped bend inserted slot position to the main support base rack. The upright wire mesh racks comprises of two wire mesh grills that are in a rectangular shape hold together and pivoted by a locking tubular ring at the bottom. The upright wire mesh racks are extending upwardly away from the surface top of the main support base rack. During use, a plurality of strips of bacon are placed longitudinally inside the upright wire mesh racks between two wire mesh grills where the upright wire mesh racks are resting in the U-shaped bend inserted slots of the main support base rack. Thus, the strip of bacon are held well above the surface of the cooking sheet pan platform away from contact with the grease that collects there during cooking.

Applicant's apparatus presents numerous advantages, including: (1) an apparatus to assist in uniformly and efficiently cooking strips of bacon with minimum of mess and inconvenience; (2) holds strips of bacon so they may be cooked on both sides simultaneously; (3) allows grease to drain from the bacon while it is cooking, providing substantially less greasy cooked bacon; (4) reduces the shrinkage and absorption of grease by strips of bacon during the cooking of the bacon in an oven; (5) supports the strips of bacon in an elevated parallel vertically oriented array while the bacon is being cooked; (6) and/cooks bacon without the need for constant turning over the strip of bacon when cooking in an oven.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments.

BRIEF DESCRIPTION OF THE DRAWINGS

The accompanying drawings, which are incorporated into and constitute a part of this specification, illustrate one or more embodiments of the present invention and, together

FIG. 2 shows an end plan view of the vertical cooking apparatus.

FIG. 3 shows a side plan view of the vertical cooking apparatus.

FIG. 4 shows a perspective view of the vertical cooking apparatus.

FIGS. 7A-7B show views of a fourth embodiment of a vertical cooking apparatus

Turning now descriptively to the drawings, in which similar reference characters denote similar elements throughout the several views, the figures illustrate the Applicant's apparatus. With regard to the reference numerals used, the following numbering is used throughout the various drawing figures:

Figure 1:
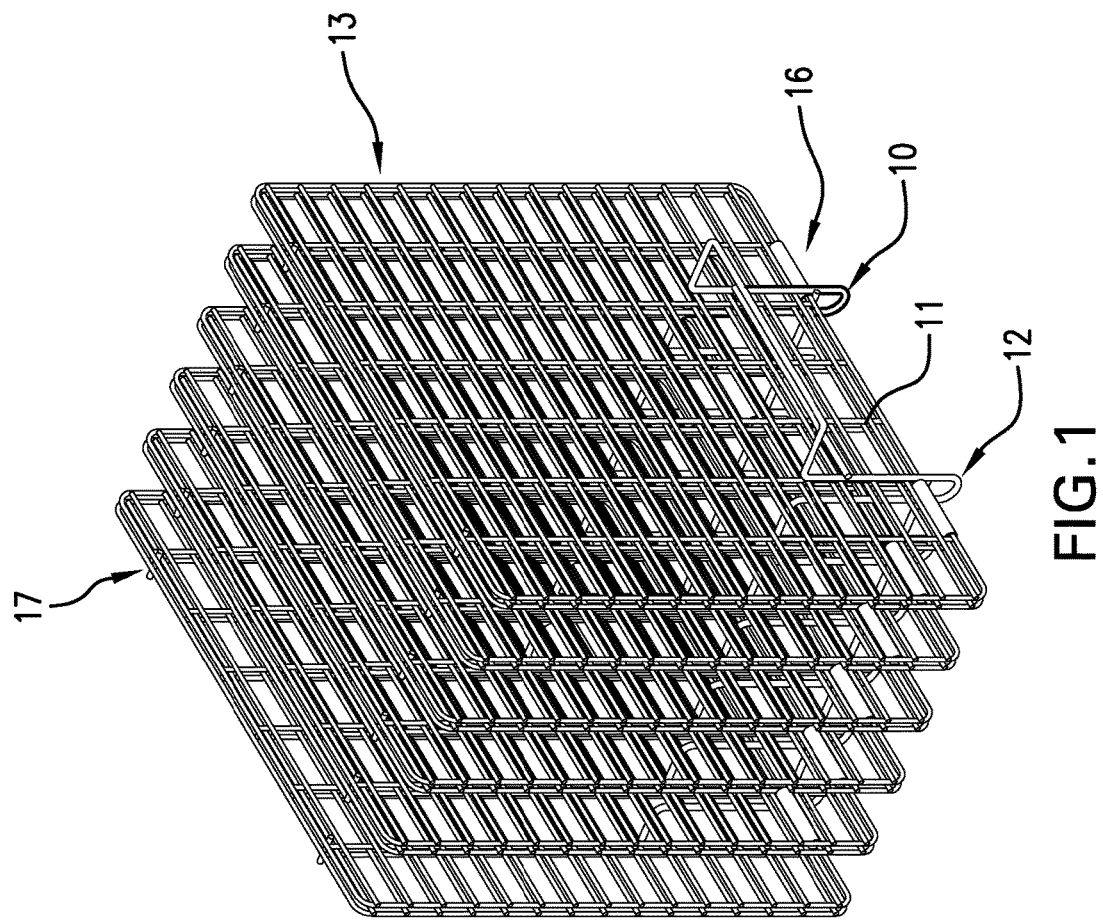
FIG. 1 shows a perspective view of the vertical cooking apparatus.

| | |
|---|---|
| 10 | Base wire rack |
| 11 | Raised sides |
| 12 | U-shaped bend inserted slots |
| 13 | Wire mesh racks |
| 14 | Handles |
| 15 | Wire mesh grills |
| 16 | Locking tubular ring |
| 17 | Wire latch |
| 18 | Cross bar connecting rod |
| 19 | Cross wire |
| 20 | Bacon strips |
| 30 | Latch rod connecting assembly |
| 31 | First latch rod loop |
| 32 | Second latch rod loop |
| 33 | Latch rod |
| 34 | Latch rod hook |
| 40 | Male female connecting assembly |
| 41 | Female connecting loop |
| 42 | Male connecting rod |
| 50 | Connecting tab |
| 60 | Hook connecting assembly |
| 61 | Hook connector |
| 70 | Hanger connecting assembly |
| 71 | End hook connector |
| 72 | Hanger |
| 81 | Mid hook connector |
| 82 | Base wire mesh grill |
| 83 | First door wire mesh grill |
| 84 | Second door wire mesh grill |

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

A vertical cooking apparatus, includes a slotted wire rack; at least two upright wire frames pivotably foldable upon each other to form a planar grill removably vertically slotted into said wire rack, wherein meat such as bacon is enclosed in said fold formed planar grill. A vertical cooking apparatus, including a slotted wire rack; at least two upright wire frames pivotably foldable upon each other to form a planar grill removably vertically slotted into said wire rack, wherein meat such as bacon is enclosed in said fold formed planar grill; and locking tubular rings connecting said wire frames pivot said frames foldably onto one another to form said planar grill. A vertical cooking apparatus, including a multi slotted holding rack; a first wire frame; a second wire frame pivotably foldable upon said first wire frame; first and second tubular locking rings pivotably connecting said first and second wire frames; and wherein said first and second wire frames fold upon one another to form a planar grill vertically slottable into said holding rack.

Applicant's vertical cooking apparatus supports and separates strips of meat such as bacon as the meat is cooked in an oven setting. Applicants' adjustable bacon rack has a plurality of spaced upright racks resting on a main support base rack for holding a number of upright wire mesh racks in upright position to provide even exposure and cooking rate for the bacon slices. Upright wire mesh racks are removably secured by U-shaped bend inserted slots to the main support base rack. A wire rack apparatus which fits on top of a shallow flat baking sheet pan and oven that supports a plurality of bacon slices vertically during roasting so that grease and fat and particular water within the body of bacon slices runs onto the shallow baking sheet pan. The bacon rack has a series of spaced upright wire mesh racks extending from a main support base rack. The upright wire mesh racks are positioned in elevated relation to a shallow baking sheet pan during cooking. The upright wire mesh racks are removably secured by U-shaped bend inserted slots to the main support base rack. Bacon slices are placed in the upright rack during roasting. The wire rack apparatus comprises of a rectangular shaped main support base wire rack with raised sides and U-shaped bend inserted slots for holding the upright wire mesh racks. Attached to the end sides of the main support base wire rack are handles for use in picking up and carrying the vertical cooking apparatus. The upright wire mesh racks are removably secured to the main support base rack resting in the U-shaped bend inserted slots. There are a plurality of upright wire mesh racks mounted on top of the main support base rack for holding the strips of bacon during cooking. The upright wire mesh racks are arranged at spaced intervals apart from each other held by their respected U-shaped bend inserted slot position to the main support base rack. The upright wire mesh racks comprises of two wire mesh grills that are in a rectangular shape hold together and pivoted by a locking tubular ring at the bottom. The upright wire mesh racks are extending upwardly away from the surface top of the main support base rack. During use, a plurality of strips of bacon are placed longitudinally inside the upright wire mesh racks between two wire mesh grills where the upright wire mesh racks are resting in the U-shaped bend inserted slots of the main support base rack. Thus, the strip of bacon are held well above the surface of the cooking sheet pan platform away from contact with the grease that collects there during cooking.

The vertical cooking apparatus for supporting and separating strips of bacon as seen in FIGS. 1, 2, 3 and 4 comprises a rectangular shaped main support base wire rack 10 with raised sides 11 and in U-shaped bend inserted slots 12 for holding the upright wire mesh racks 13. In FIGS. 1, 2, 3 and 4 attached to the sides of the main support base wire rack 10 are handles 14 for use in picking up and carrying the cooking wire rack. FIGS. 1, 2, 3 and 4 show upright wire mesh racks 13 resting in the U-shaped bend slots 12. In FIGS. 1, 2 and 3, there are a plurality of upright wire mesh racks 13 mounted on top of the main support base rack 10 for holding the strips of bacon 20 (shown in phantom lines in FIG. 4) during cooking. FIGS. 1 and 3 show the upright wire mesh racks 13 are arranged at spaced intervals apart from each other by their respected U-shaped bend inserted slots 12 position with the main support base rack 10. FIG. 4 show the upright wire mesh racks 13 comprises of two wire mesh grills 15 in a rectangular shape held together by a locking tubular ring 16 at the bottom. In the top portion of the upright wire mesh racks is located a wire latch 17 that connects the two wire mesh grills as shown in FIGS. 1, 3 and 4. FIGS. 1, 2 and 3 show the upright wire mesh racks 13 extending upwardly away from the surface top of the main support base rack 10. In FIG. 4, during use, a plurality of strips of bacon 20 are placed longitudinally inside the upright racks 13 between two wire mesh grills 15 where the upright wire mesh racks 13 are resting in the U-shaped bend slots 12 of the main support base rack 10 as shown in FIGS. 1, 2 and 3. The U-shaped bend slots on the sides of the main support base rack are held by a cross bar connecting rod 18 that runs from one end to the other end of the slots shown in FIGS. 3 and 4. The main support base rack is held by cross wire 19 at each end and in the middle as shown in FIGS. 3 and 4.

Figure 5B:
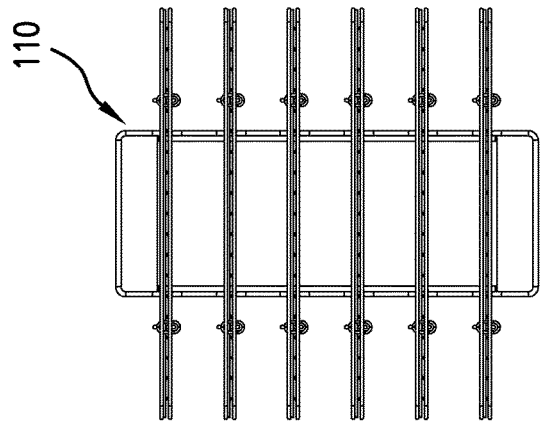
FIGS. 5A-5I show views of a second embodiment of a vertical cooking apparatus.
Figure 5D:
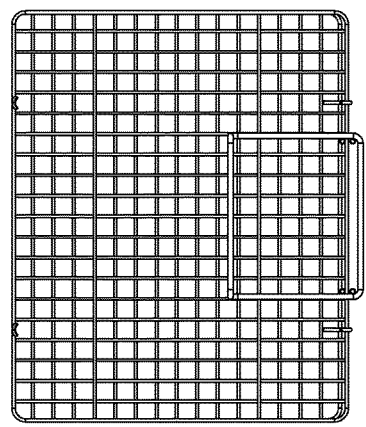
Figure 5A:
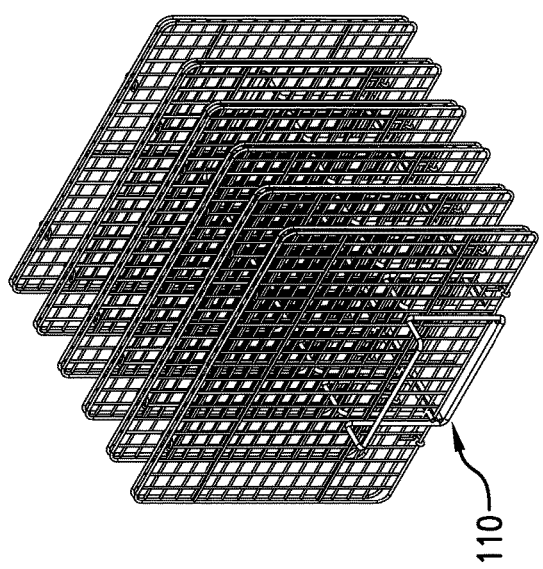
Figure 5C:
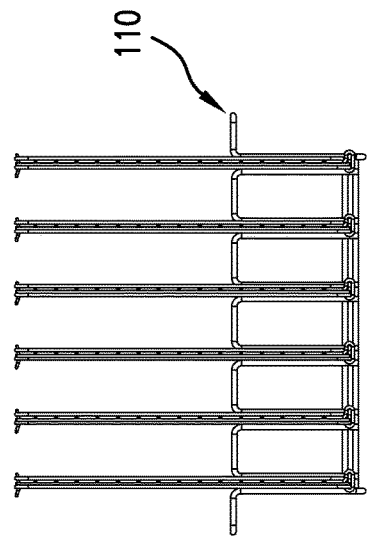
Figure 5F:
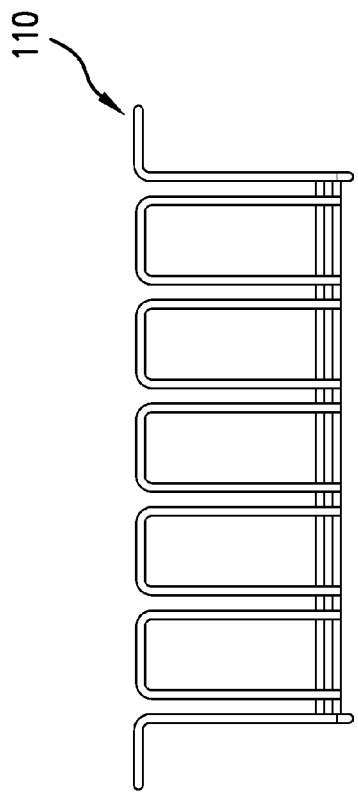
Figure 5H:
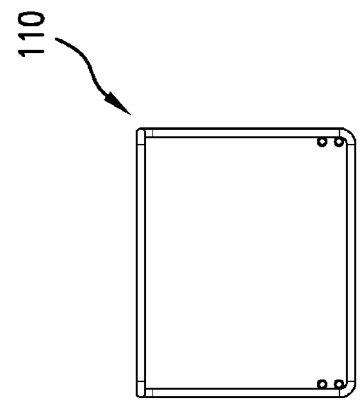
Figure 5E:
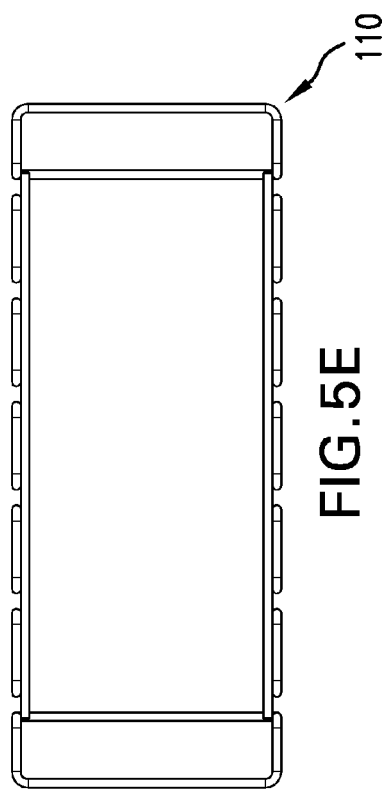
Figure 5G:
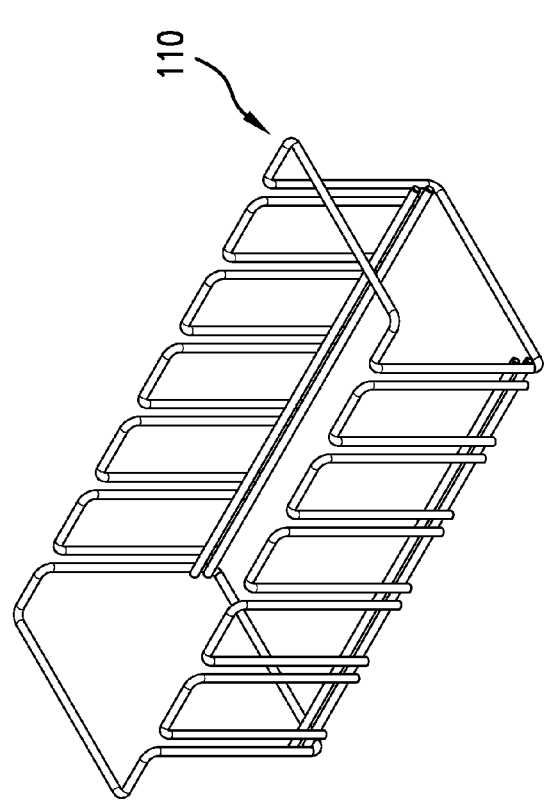
Figure 5I:
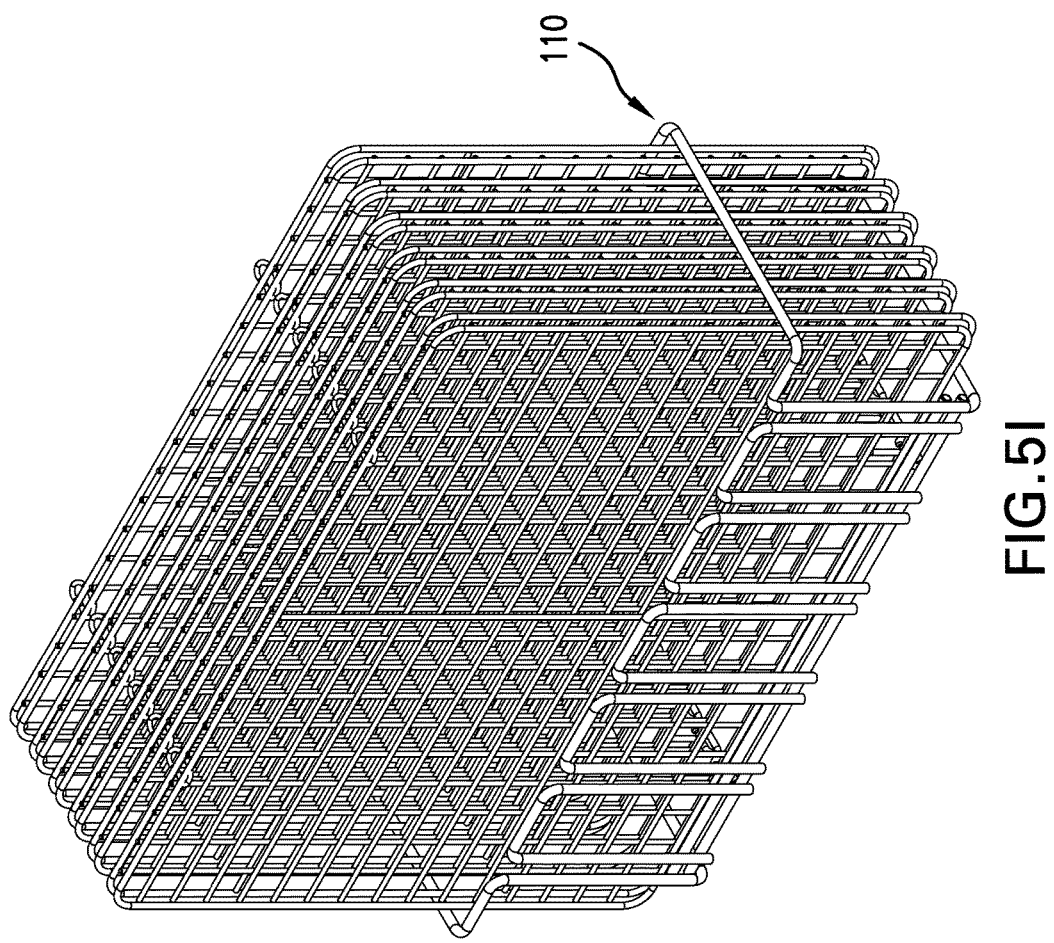

FIGS. 5A-5I show a second embodiment of a vertical cooking apparatus, with an alternative base wire rack 110. FIG. 5A shows the second embodiment of the vertical cooking apparatus fully configured. FIG. 5C shows a side view of the second embodiment of the vertical cooking apparatus. FIG. 5B shows a top down view of the second embodiment of the vertical cooking apparatus. FIG. 5D shows a front view of the second embodiment of the vertical cooking apparatus. FIG. 5E shows a top down view of the alternative base rack 110. FIG. 5F shows a side view of the alternative base rack 110. FIG. 5G shows a perspective view of the alternative base rack 110. FIG. 5I shows the second embodiment of the vertical cooking apparatus in storage configuration.

Figure 6B:
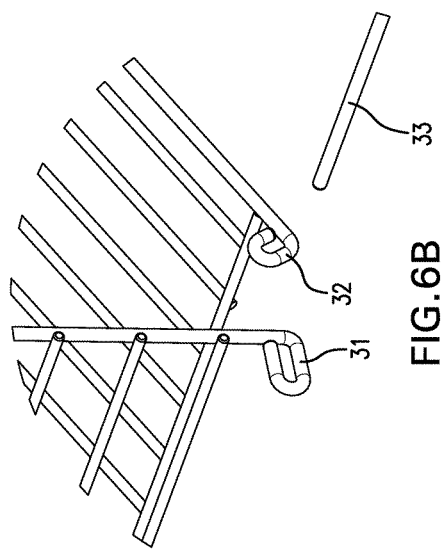
FIGS. 6A-6B show views of a third embodiment of a vertical cooking apparatus.
Figure 6A:
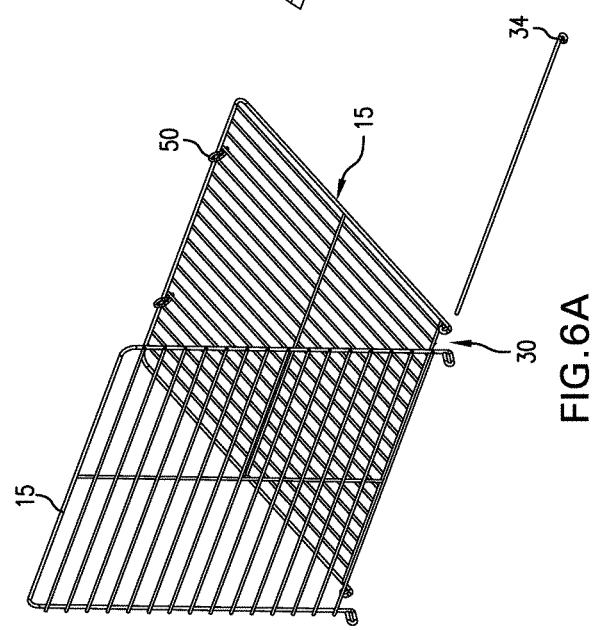

FIGS. 6A and 6B show a third embodiment of a vertical cooking apparatus, with a latch rod connecting assembly 30 having a latch rod 33 and a first latch rod loop 31 and second latch rod loop 32 through which the latch rod 33 inserts, with the latch rod hook 34 locking on to the second latch rod loop 32. FIG. 6A also shows an alternative apparatus for locking the wire mesh racks together, a connecting tab 50, having a downward concave curvature, which slides over, and puts downward connecting pressure on an opposing wire mesh grill 15.

FIGS. 7A and 7B show a fourth embodiment of a vertical cooking apparatus, with a male female connecting assembly, 40, having a male connecting rod 42 and a female connecting loop 41 through which the male connecting rod 42 insertably fits.

Figure 8B:
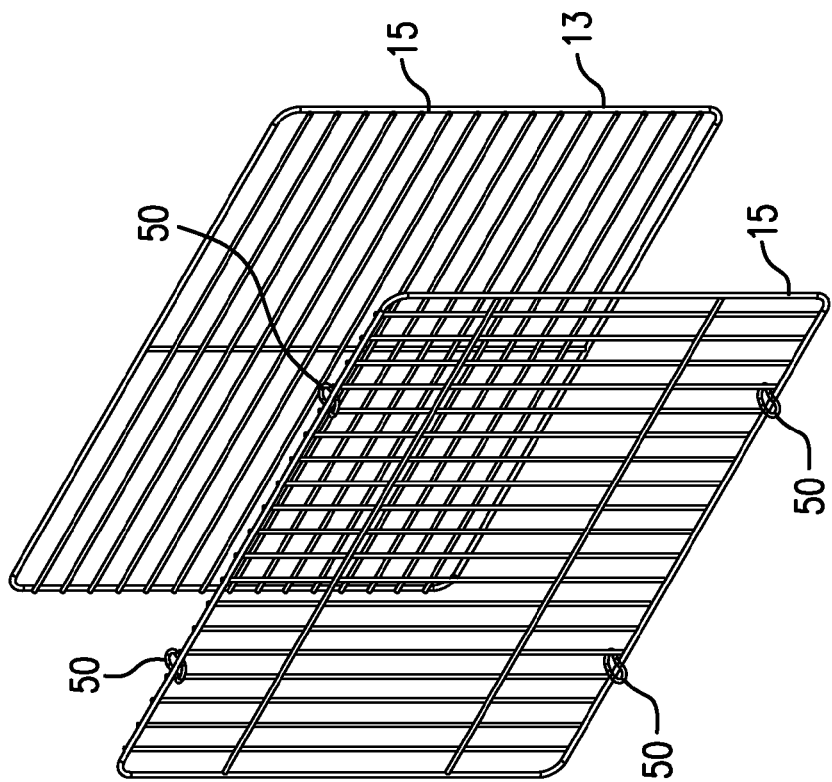
FIGS. 8A-8B show views of a fifth embodiment of a vertical cooking apparatus
Figure 8A:
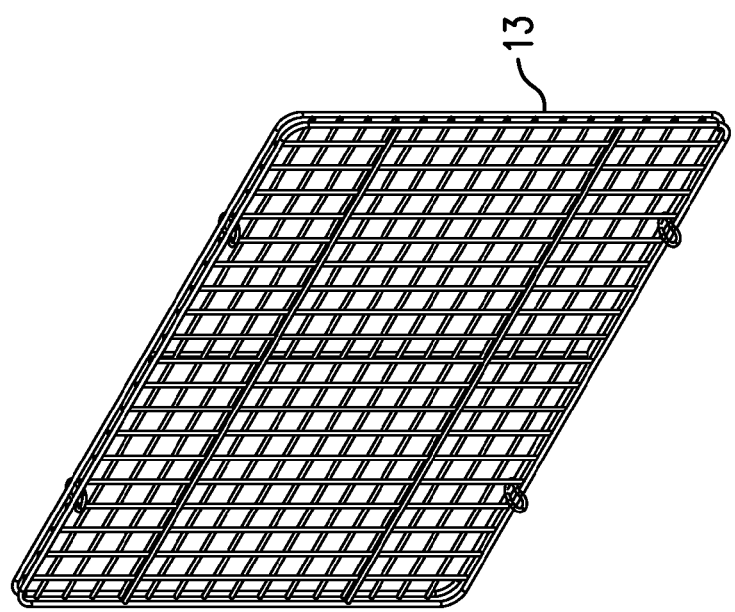
Figure 9C:
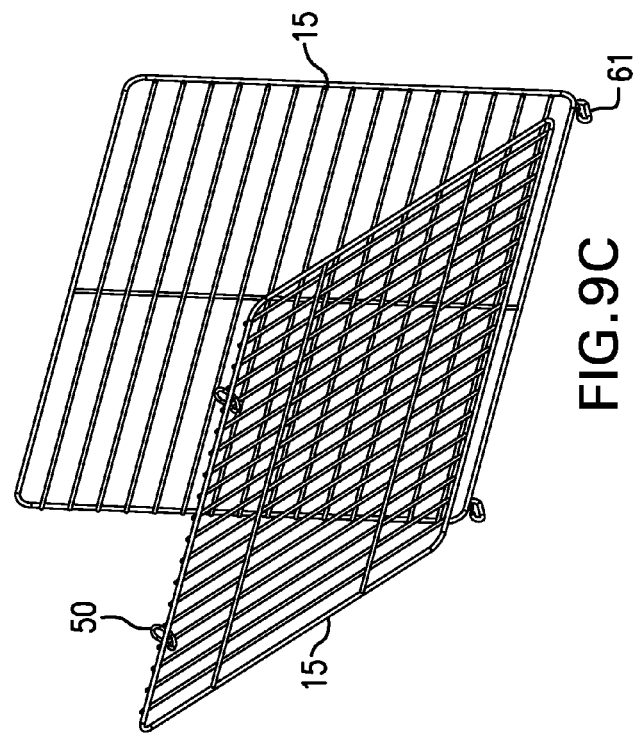
FIGS. 9A-9D show views of a sixth embodiment of a vertical cooking apparatus
Figure 9D:
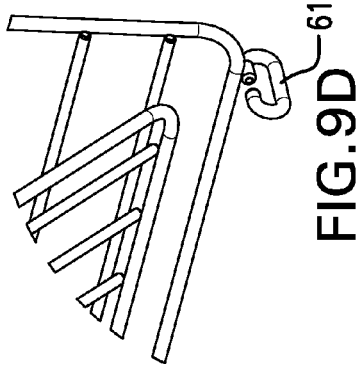
Figure 9A:
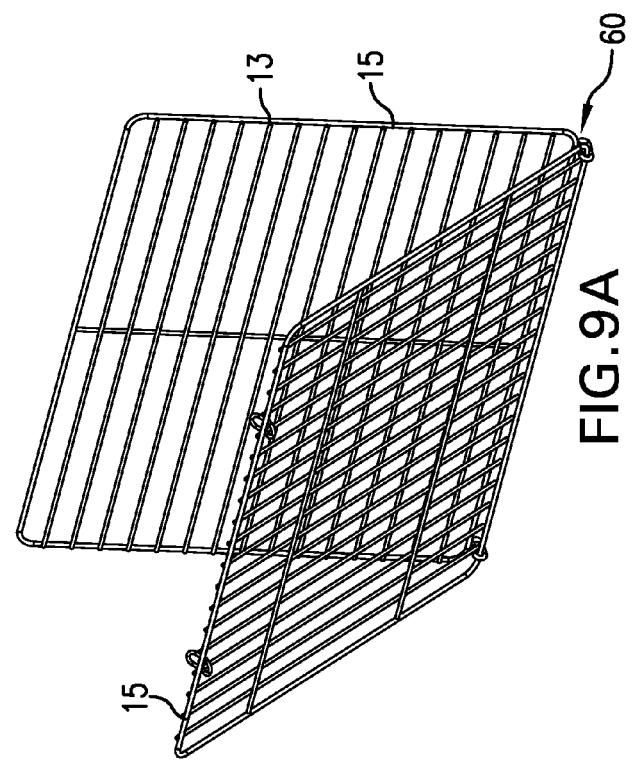
Figure 9B:
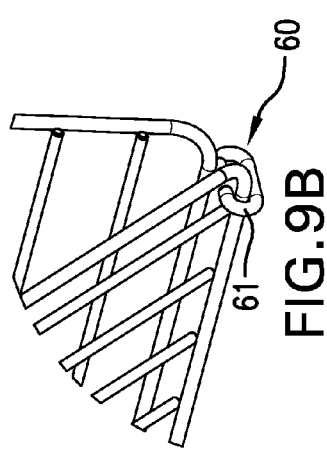
Figure 10A:
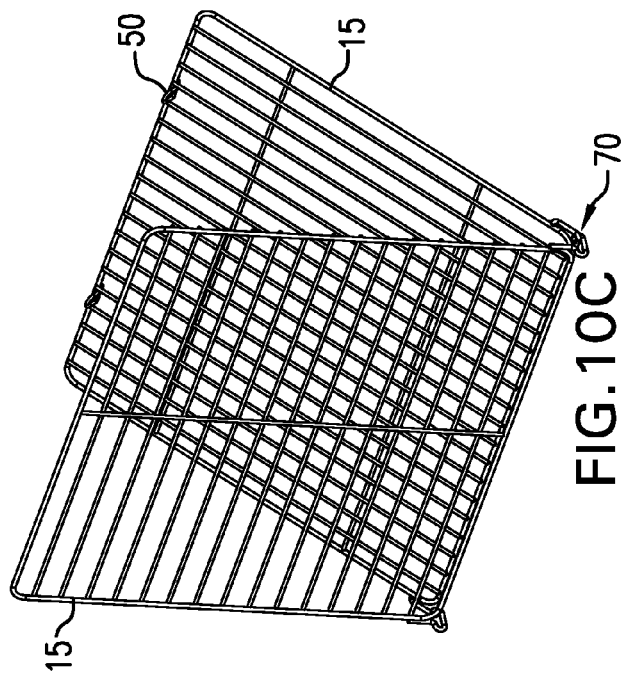
FIGS. 10A-10D show views of a seventh embodiment of a vertical cooking apparatus.
Figure 10B:
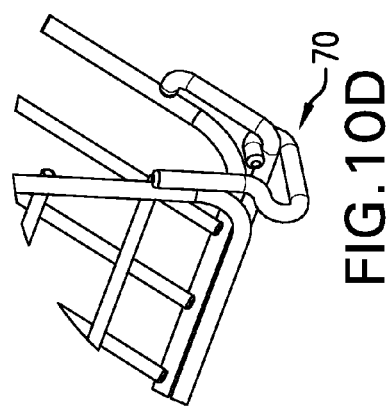
Figure 10C:
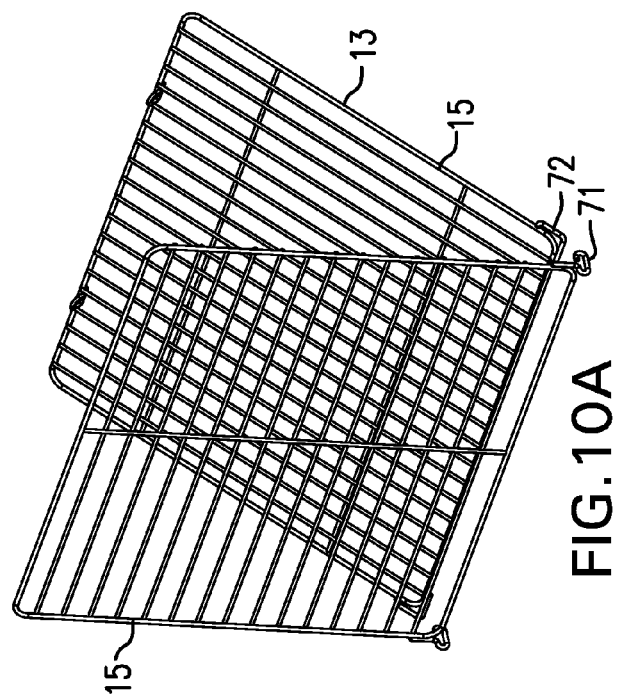
Figure 10D:
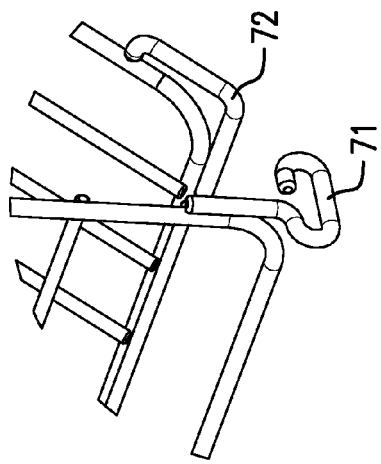

FIGS. 8A and 8B show a fifth embodiment of a vertical cooking apparatus, with the removable connecting assembly utilizing a plurality of connecting tabs 50.

FIGS. 9A-9D show a sixth embodiment of a vertical cooking apparatus, with a hook connecting assembly 60 having a hook connector 61 which hooks the wire mesh rack 13.

FIGS. 10A-10D show a seventh embodiment of a vertical cooking apparatus, with a hanger connecting assembly, having a end hook connector 71 which hooks a hanger 72 on a wire mesh rack 13.

Figure 11C:
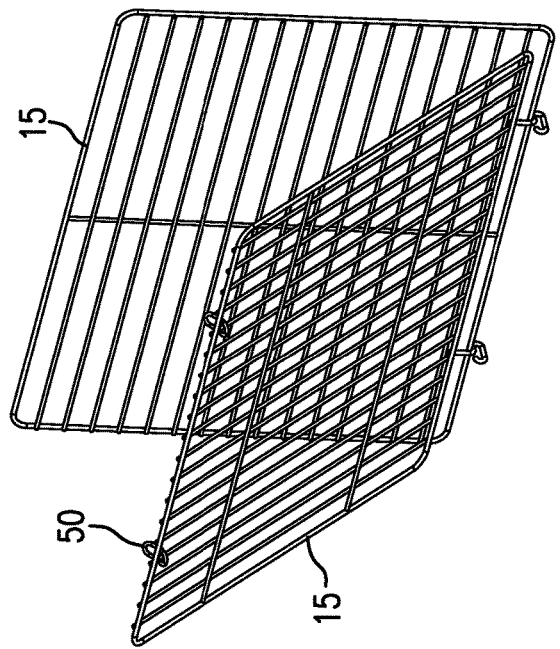
FIGS. 11A-11D show views of an eighth embodiment of a vertical cooking apparatus.
Figure 11D:
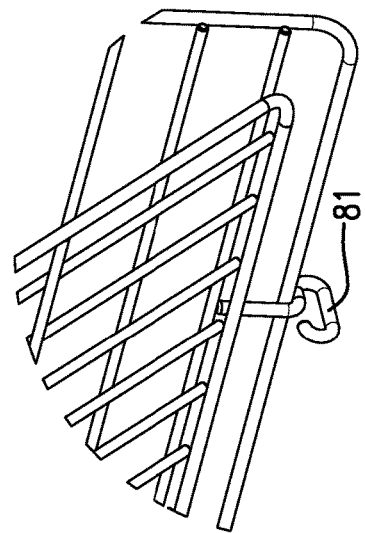
Figure 11A:
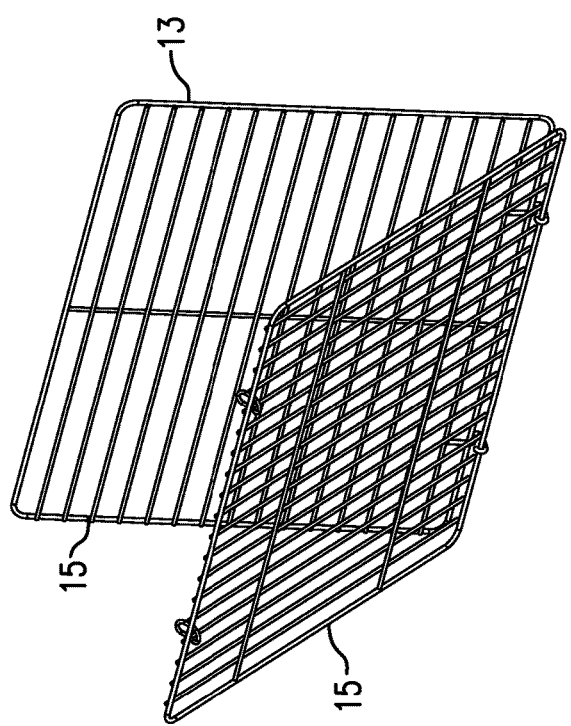
Figure 11B:
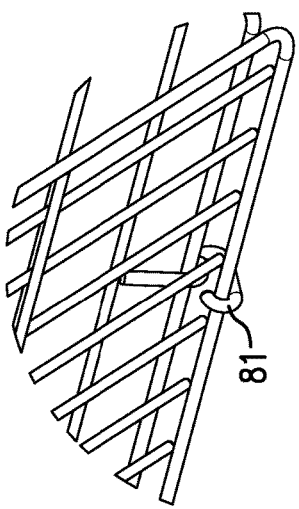

FIGS. 11A and 11B show an eighth embodiment of a vertical cooking apparatus, with the connecting assembly a mid hook connector 81 which hooks the wire mesh rack 13.

Figure 12B:
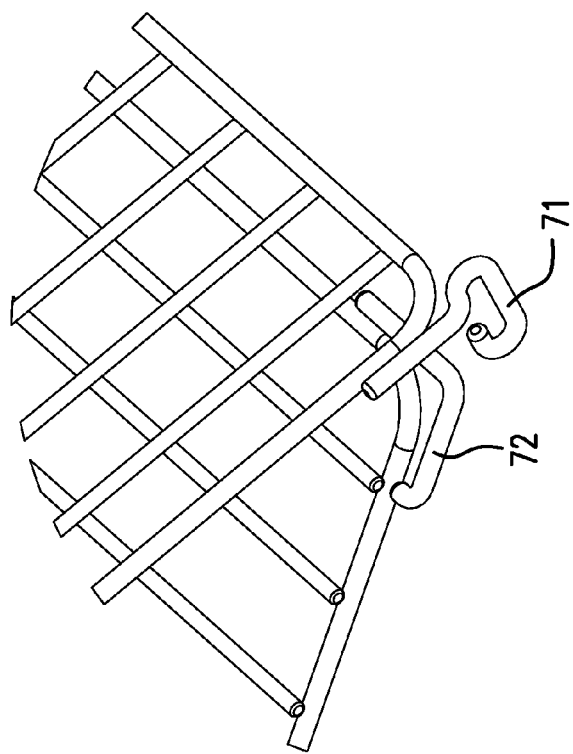
FIGS. 12A-12B show views of a ninth embodiment of a vertical cooking apparatus.
Figure 12A:
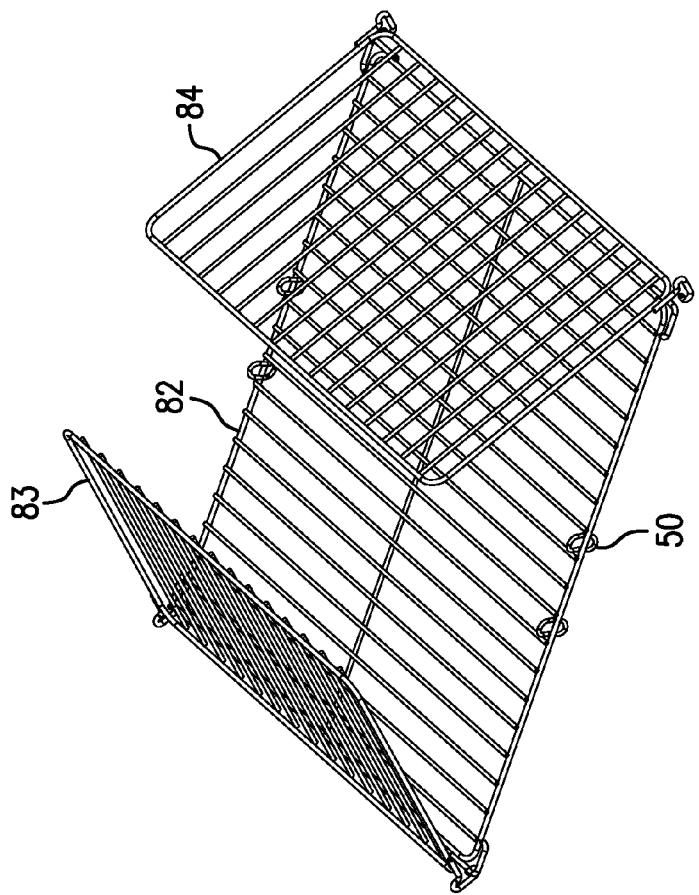

FIGS. 12A and 12B show a ninth embodiment of a vertical cooking apparatus in a french door format, with a base wire mesh grill 82, and first and second door wire mesh grills 83, 84 which fold down and lock in place with connecting tabs 50, and are removably connected to the base wire mesh grill 82 using the hanger connecting assembly of a hanger 72 and end hook connector 71.

Figure 13B:
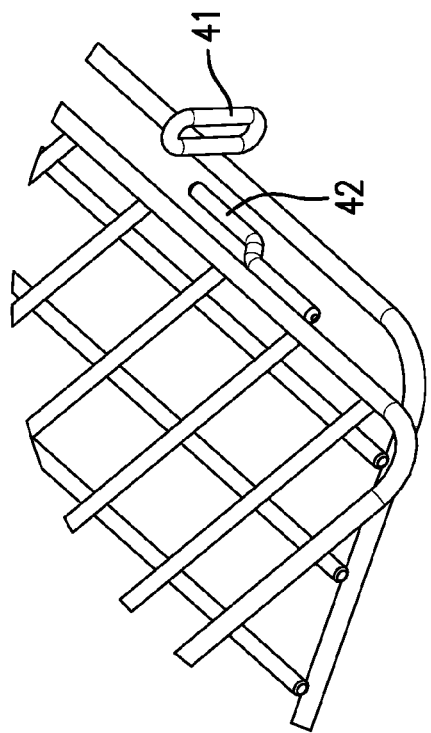
FIGS. 13A-13B show views of another embodiment of a vertical cooking apparatus.
Figure 13A:
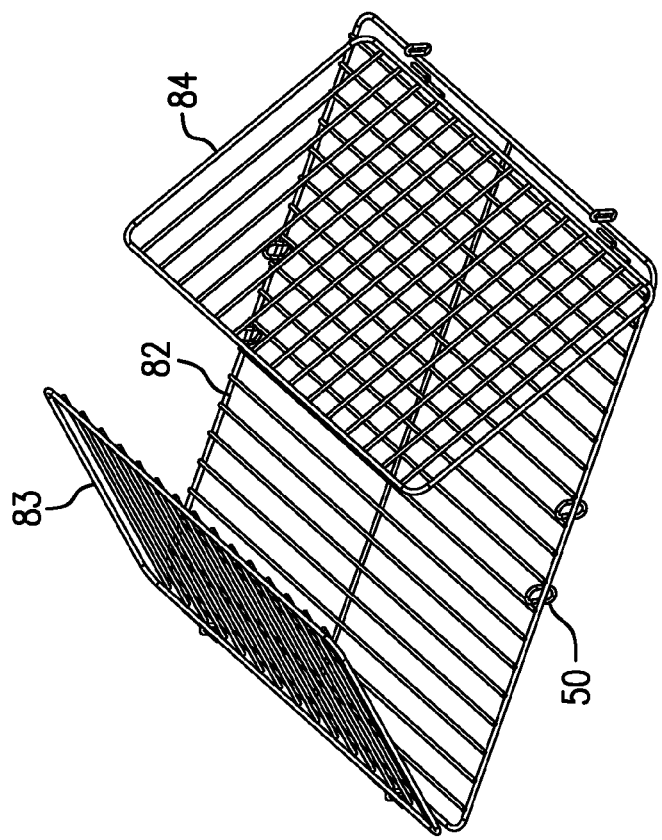

FIGS. 13A and 13B show a tenth embodiment with the French door format as in the ninth embodiment shown in FIGS. 12A and 12B, but first and second door wire mesh grills 83, 84 can removably connect to the base wire mesh grill 82 using the male-female connecting assembly with the female loop 41 and the male rod 42.

In at least one embodiment of the vertical cooking apparatus, the slots 12 are spaced at least ⅛ inch from each other, and no more than inches from each other to allow air and heat to circulate between the mesh racks 13.

Those skilled in the art will recognize that the base rack for holding upright mesh racks may be configured in alternative equivalent embodiments, such as by having the slots angled, or by having the rack in a wagon wheel shape with aligned such that mesh racks radiate out like spokes from the center of the base rack.

It will be apparent from the foregoing description that strips of bacon placed elevated and vertically in the upright wire mesh rack of the invention will cook evenly since the strips of bacon surfaces are exposed to the heat evenly and thermal currents produced within the oven will circulate effectively around the bacon strips in a highly desirable manner unlike that of present shallow cooking flat baking sheet pan. Therefore eliminating the need to constantly turning over of the bacon strips when cooking in the oven.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. A vertical cooking apparatus, comprising:
a base wire rack with one or more slots therein;
one or more mesh racks, each removably inserted into one of the one or more slots;
wherein at least one of the mesh racks has a first mesh grill having a first mesh grill edge and a second mesh grill having a second mesh grill edge, wherein the first mesh grill edge is pivotally and detachably coupled to the second mesh grill edge;
wherein the first mesh grill has a pair of first latch rod loops coupled to the first mesh grill edge;
wherein the second mesh grill has a pair of second latch rod loops coupled to the second mesh grill edge;
wherein the mesh rack has a latch rod detachably inserted into the first latch rod loops and the second latch rod loops;
wherein the latch rod has a latch rod hook configured for detachably locking onto one of the second latch rod loops; and
wherein the one of the second latch loops is closed oval loop.

2. The vertical cooking apparatus of claim 1,
wherein each of the mesh grills has a front side and a back side;
wherein the one of the mesh racks is configured such that the first mesh grill can couple to the second mesh grill with the front side of the first mesh grill facing the back side of the second mesh grill; and
wherein the one of the mesh racks is configured such that the first mesh grill can couple to the second mesh grill with the front side of the first mesh grill facing the front side of the second mesh grill.

3. The vertical cooking apparatus of claim 1,
wherein the first mesh grill of the one of the mesh racks comprises a first plurality of parallel wires;
wherein the second mesh grill the one of the mesh racks comprises a second plurality of parallel wires; and
wherein the wires of the first plurality of parallel wires are orthogonal to the wires of the second plurality of wires when the one of the mesh racks is in a closed position.

4. The vertical cooking apparatus of claim 1,
wherein the one of the mesh racks has a third mesh grill having a third mesh grill edge;
wherein the first mesh grill has a fourth mesh grill edge opposite the first edge; and
wherein the third mesh grill edge is pivotally coupled to the fourth mesh grill edge.

5. The vertical cooking apparatus of claim 1,
wherein the one of the mesh racks and the wire base rack are configured such that the one of the mesh racks may be removed from one of the slots in the wire base rack flipped and rotated and inserted back into the one of the slots in the wire base rack.

* * * * *